July 19, 1955 G. R. BEARDSLEY 2,713,332
INTERNAL COMBUSTION ENGINE COOLING SYSTEM
Filed March 27, 1953 7 Sheets-Sheet 2

Inventor,
Gale R. Beardsley
Paul O. Pippel
Atty.

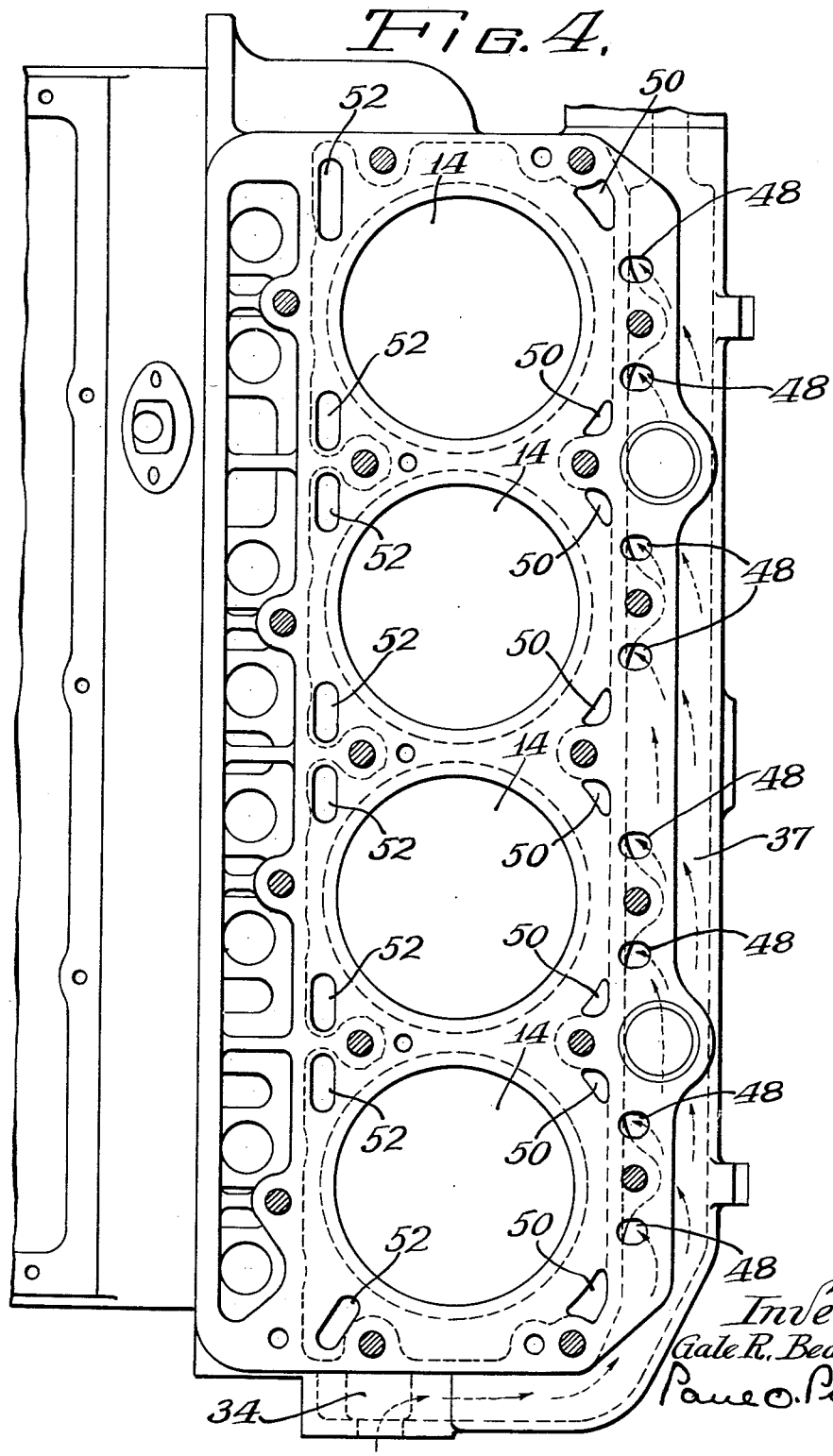

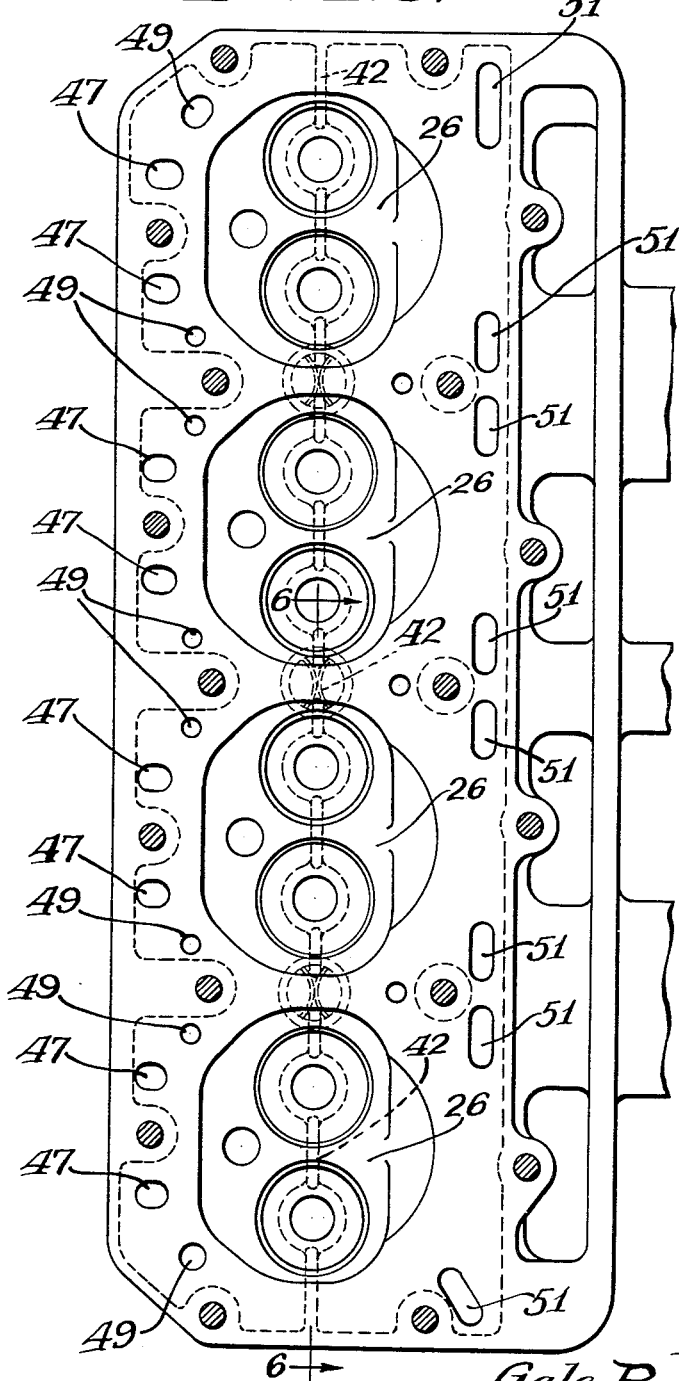

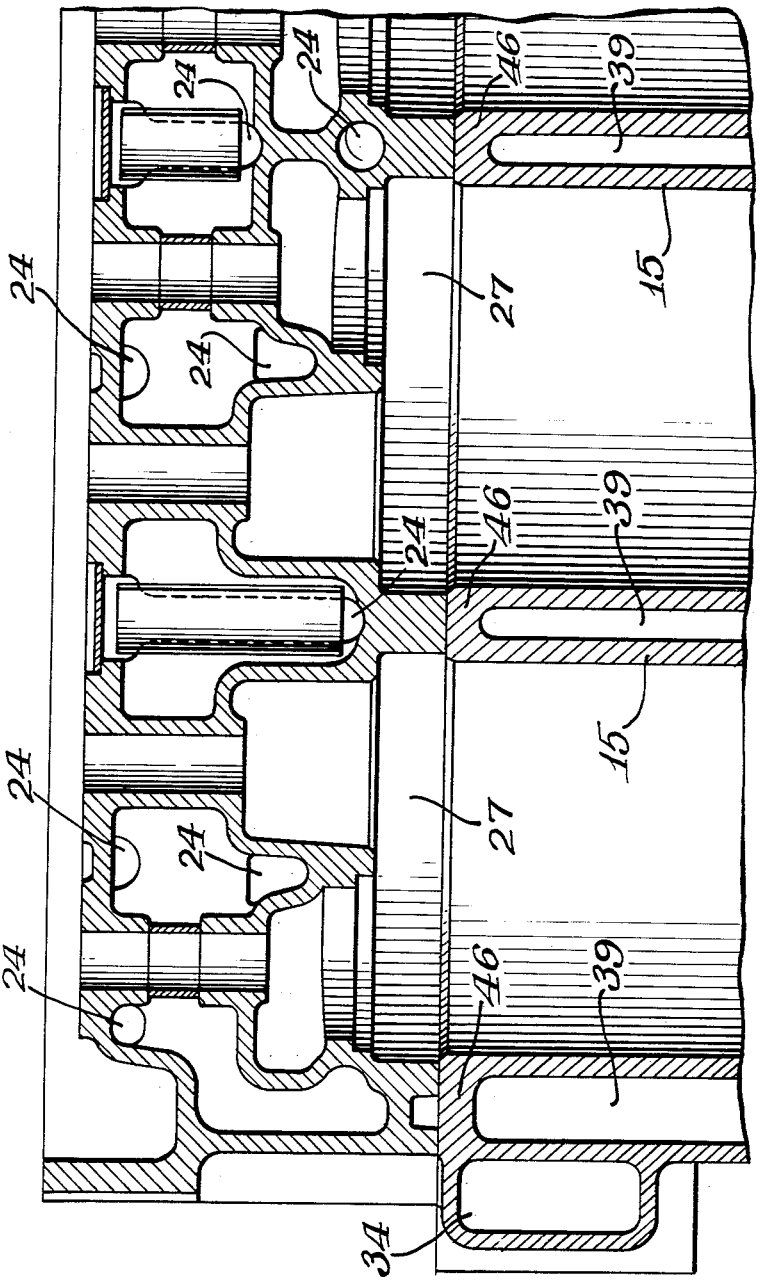

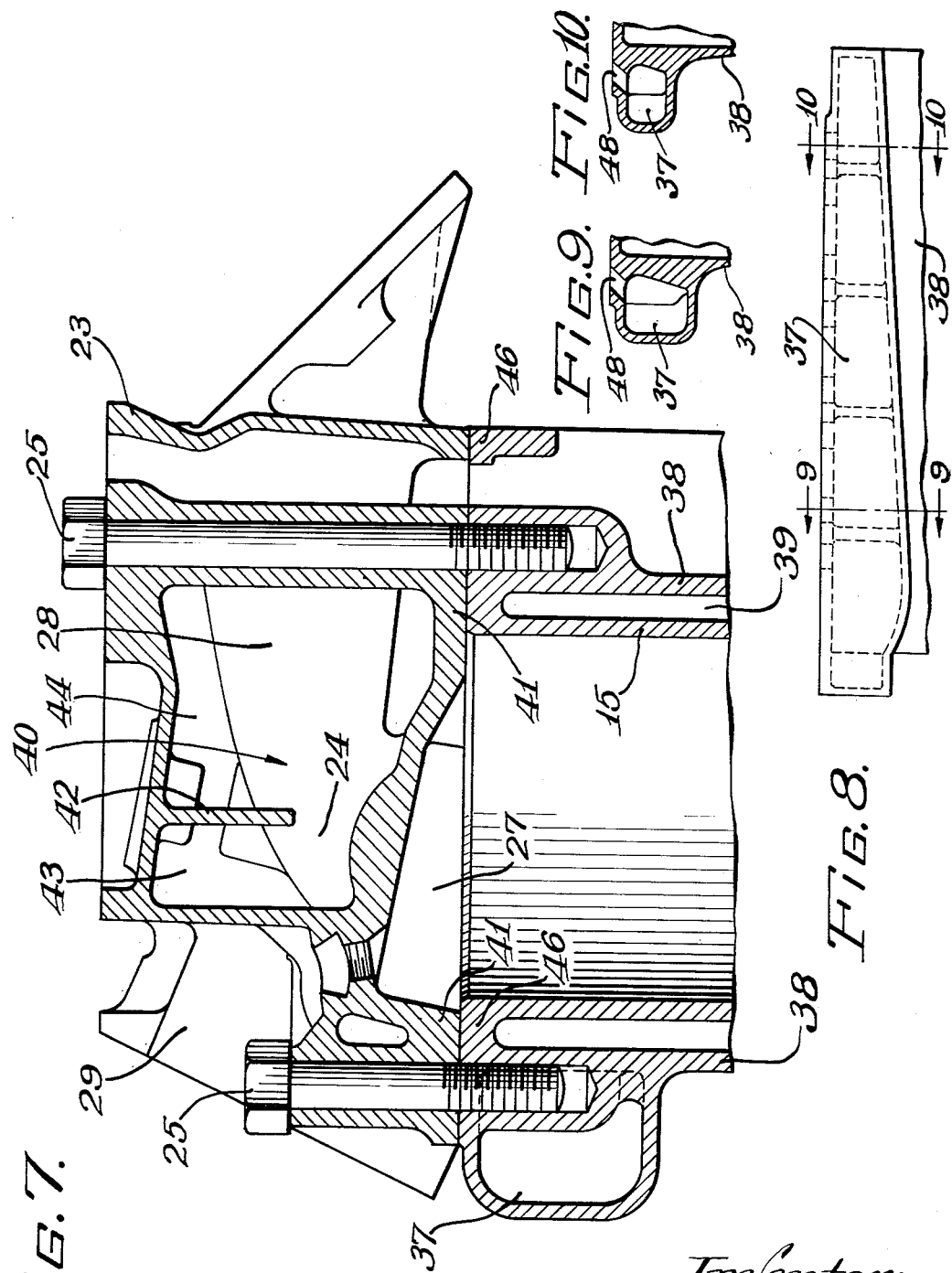

United States Patent Office 2,713,332
Patented July 19, 1955

2,713,332

INTERNAL COMBUSTION ENGINE COOLING SYSTEM

Gale R. Beardsley, Fort Wayne, Ind., assignor to International Harvester Company, a corporation of New Jersey Application March 27, 1953, Serial No. 345,123

14 Claims. (Cl. 123—41.28)

This invention relates to internal combustion engines, and more particularly to novel cooling systems therefor.

In the design of internal combustion engines, especially of the V-type wherein the cylinders are arranged in a pair of banks which are disposed angularly with respect to each other, the provision of means for efficiently cooling the engines is an important factor to be considered since the maximum power output and the efficiency of operation of internal combustion engines is obtained only when the heat of the products of combustion is efficiently dissipated. A large quantity of heat has to be removed continuously from the surfaces of the operating cylinders and cylinder heads in order to prevent the internal parts of the engine from reaching temperatures so high as to damage the parts or impair lubrication of the bearings and valves.

The detrimental excess heat is usually removed by a cooling system which provides for the circulation of a coolant, such as water, around, and in intimate contact with, the parts of the engine required to be cooled, such as the cylinders and cylinder head. Generally, in liquid cooled engines, the coolant comes into one end of the engine adjacent a particular cylinder and passes across the other cylinders through jackets surrounding the cylinders and cylinder heads from one end of the engine to the other and then through a heat exchanger or radiator wherein the heat is removed from the circulating coolant. Obviously, the coolant is at a lower temperature when it is first introduced into the jackets and increases in temperature as it proceeds through the engine with the result that an uneven cooling effect of the cylinders is produced with subsequent well known disadvantages, such as uneven distribution of gas and charges and uneven action by the respective cylinders.

It will be appreciated that the cooling system problems confronting the designer of a multi-cylinder engine are magnified in the design and construction of V-type engines wherein the cylinders are arranged in two banks in angular relation to one another. As was pointed out above, the operating efficiency and durability of an engine is dependent upon the capability of the cooling system to maintain the temperature of each cylinder substantially the same and at a particular degree and since the cylinders are separated into banks the design problems are increased. It is a great deal more difficult to eliminate variations in temperature between the two banks because of the variation in the combustion in the cylinders of the two banks, unequal fuel distribution to the banks, non-uniform fan blast effect on the banks, and casting discrepancies present in one bank and not in the other bank. Hence, it is a principal objective of the present invention to provide an engine cooling system for a V-type engine whereby the coolant is introduced into the engine and distributed therein in such a manner that all of the cylinders and parts of the engine are effected uniformly by the coolant regardless of the disposition of a particular cylinder with reference to the other cylinders and the cylinders and parts of the engine are cooled and maintained at a particular proper temperature for efficient operation.

A further object is the provision of a novel construction and arrangement of the coolant jackets formed in the cylinder blocks and heads of a multiple cylinder engine wherein the coolant flow is distributed in such a manner as to obtain a uniform and proper cooling of the several cylinders.

A further object is to provide a cooling system in which coolant is circulated through an inlet manifold, integrally formed with the cylinder block, by means of a pump or some other impelling mechanism and to further provide an exhaust manifold within the cylinder head structure through which the coolant passes to the radiator.

A still further object is to provide a partition extending along the length of the cylinder head delineating one face of a distributing header and having openings therein for the circulation of coolant directly to the coolant exhaust manifold.

Another object is the provision of a coolant distributing header in the cylinder head, said header being in fluid communication with an inlet manifold formed in the cylinder block, and passage means for simultaneously circulating coolant from the header to a cylinder block jacket and directly to an outlet manifold.

Still another object is to provide a cooling system for a multiple cylinder engine wherein the distribution of the coolant is so regulated and controlled so as to obtain a substantially equal cooling effect upon the several cylinders disposed longitudinally along the length of the engine.

A further object is to construct an improved cooling system for a V-type internal combustion engine which includes an oil cooler and novel means for supplying coolant to the oil cooler.

The foregoing and other important objects and desirable features inherent in and encompassed by the invention, together with many of the purposes and uses thereof, will become readily apparent from a reading of the ensuing description in conjunction with the annexed drawings, in which:

Figure 4 is a plan view of one bank of cylinders looking in the direction of line 4—4 of Figure 3;

Figure 5 is a view taken along line 5—5 of Figure 3 showing the underside of one of the cylinder heads;

Figure 6 is a sectional view taken substantially along line 6—6 of Figure 5;

Figure 7 is a typical vertically transverse sectional view of the head and a portion of the block;

Figure 8 is a side elevational view of an inlet manifold;

Figure 9 is a sectional view taken substantially along line 9—9 of Figure 8; and Figure 10 is a sectional view taken substantially along line 10—10 of Figure 8.

Figure 2:
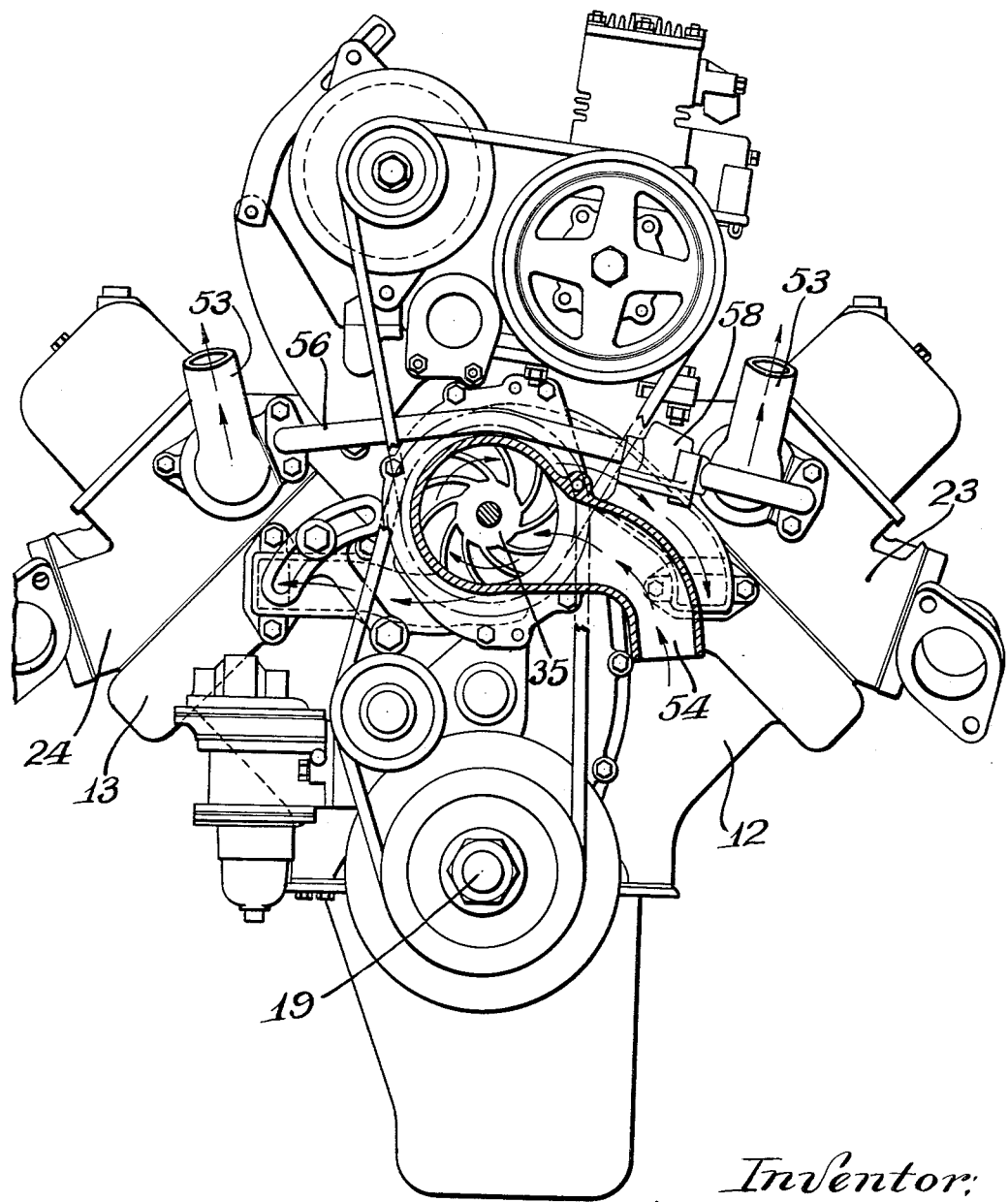
Figure 2 is an end elevational view of the forward part of the engine showing the coolant pump partially in cross section.
Figure 3:
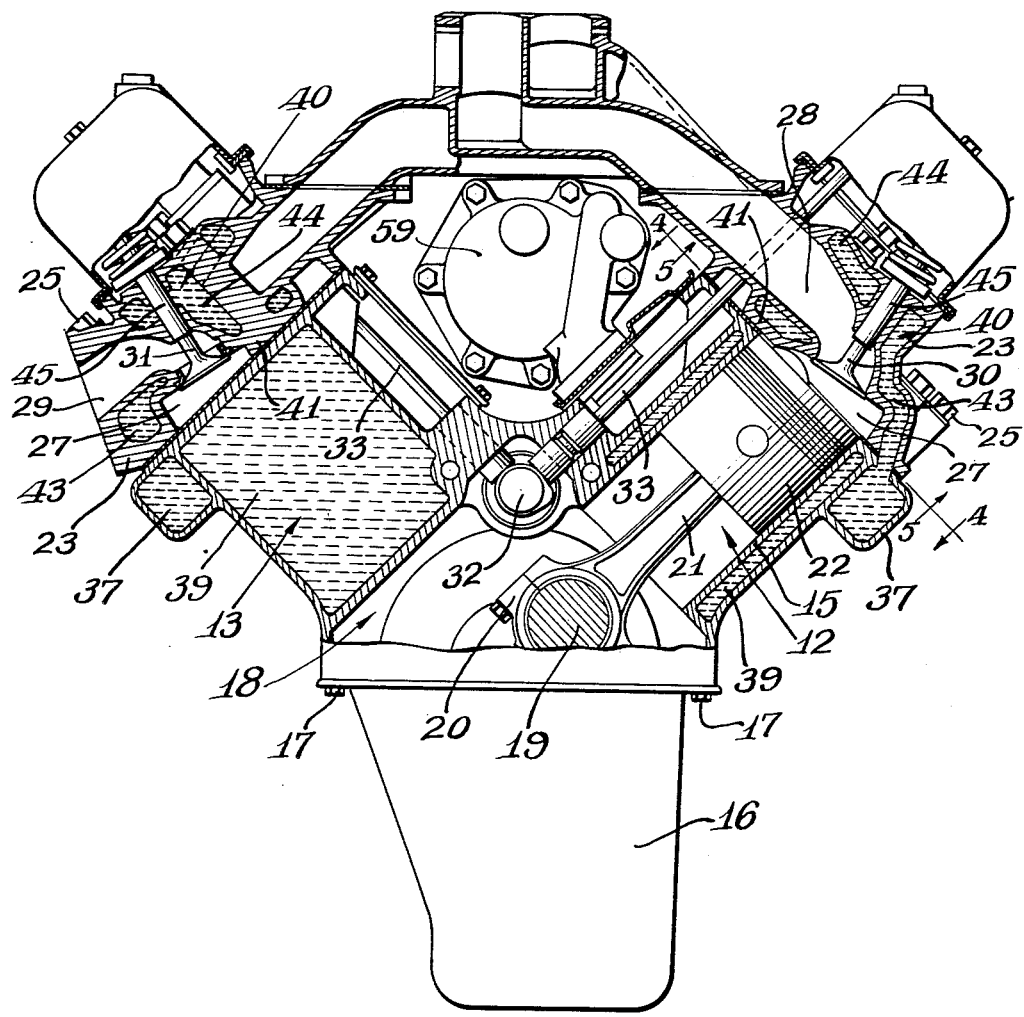
Figure 3 is an end view of the engine shown partially in cross section.

Referring to the drawings in detail, wherein like reference characters designate like elements throughout the various views, there is shown an engine cooling system which includes a coolant heat exchanger or radiator 10 and a V-type internal combustion engine 11. The engine 11 being a V-type comprises two banks 12, 13 of cylinders arranged at an angle with respect to each other to form a V, as best shown in Figures 2 and 3. Each bank 12, 13 of the engine 11 disclosed has four separate cylinders 14 arranged parallel with one another and spaced longitudinally along the length of the engine 11. The cylinders 14 are defined by open-ended cylindrical walls 15. As best illustrated in Figure 3, the banks 12 and 13 are cast or formed whereby their lower ends are integrally connected. A flanged oil pan 16 is fastened to the lowermost edges of the banks 12 and 13 by means of bolts 17 and serves as a sump or reservoir for the engine lubricating oil. It is to be understood that the banks 12 and 13 form the engine cylinder block 18 and the left hand bank 13, as viewed in Figure 2, has elements and features of construction and operation, hereinafter to be described, exactly like those of the right hand bank 12, which will be referred to in detail.

Rotatably supported by the cylinder block 18 is a crankshaft 19 to which the lower ends 20 of connecting rods 21 are journaled. The opposite ends of the connecting rods 21 are operatively connected to the pistons 22 (only one is shown in Figure 3) which are slidable in the cylinders 14. Cylinder heads 23 are secured to the upper ends of the banks 12 and 13 by means of bolts 25 and close the upper ends of the cylinders 14. The underside of each cylinder head 23 is formed with a plurality of depressions 26, each of which is positionable over a respective cylinder 14 and cooperates therewith to form a combustion chamber 27. The air-fuel mixture is admitted to the combustion chambers 27 through cored passages 28 formed in the cylinder heads 23 and likewise the products of combustion are discharged from the combustion chambers through passages 29 also formed in the heads. An intake valve 30 is disposed in each passage 28 for controlling the flow of air-fuel mixture to its respective cylinder 14. The flow of exhaust gases from the cylinders 14 is controlled by exhaust valves 31 disposed in the passages 29. The valves 30 and 31 are actuated by a camshaft 32, driven by the crankshaft 19, through suitable push rods 33, operating levers and elements.

One end of each bank 12 and 13 is provided with a transversely extending, cored coolant inlet passage 34. A fluid pressure pump 35, supported and driven by the engine 11, has a pair of discharge passages 36, each of which is connected to an end of a respective inlet passage 34. Referring to the right hand bank 12, the inlet passage 34 leads into a coolant inlet manifold 37 arranged longitudinally along the outer side of and cast integrally with the bank 12. The inlet manifold 37 extends the full length of the bank 12 and progressively decreases in cross sectional area from the end thereof connected to the inlet passage 34 to its opposite end. The purpose of the progressive variance in the cross sectional area of the inlet manifold, as best shown in Figure 8, will be explained hereinafter.

The cylinder walls 15 of the cylinders 14 of each bank 12, 13 are spaced from each other and from the outer wall 38 of the bank in which they are contained to provide a common coolant jacket or coolant circulating space 39 which substantially surrounds the cylinders.

The cylinder head 23 associated with each bank 12, 13 is hollow to form a coolant jacket or circulating space 40 which is partially defined by the bottom wall 41 of the cylinder head. A longitudinally extending, generally vertical partition or wall 42 is located within the space 40 and divides the space into a distributing header 43 and a coolant outlet chamber 44. As best shown in Figure 3, the valve stem guides 45 for the intake and exhaust valves 30 and 31 are secured to the head 23 and are, in effect, a part of the partition 42. The partition 42 is provided with a plurality of apertures 24 along its length for establishing controlled coolant communication between the distributing header 43 and the coolant outlet chamber 44. It will be obvious that the coolant, as it flows through the apertures 24, quickly absorbs the heat from the upper wall of the combustion chambers 27 and the valve stem guides 45. Certain of the apertures 24 are disposed along the top of the partition 42 to prevent the formation of steam bubbles or pockets.

Figure 1:
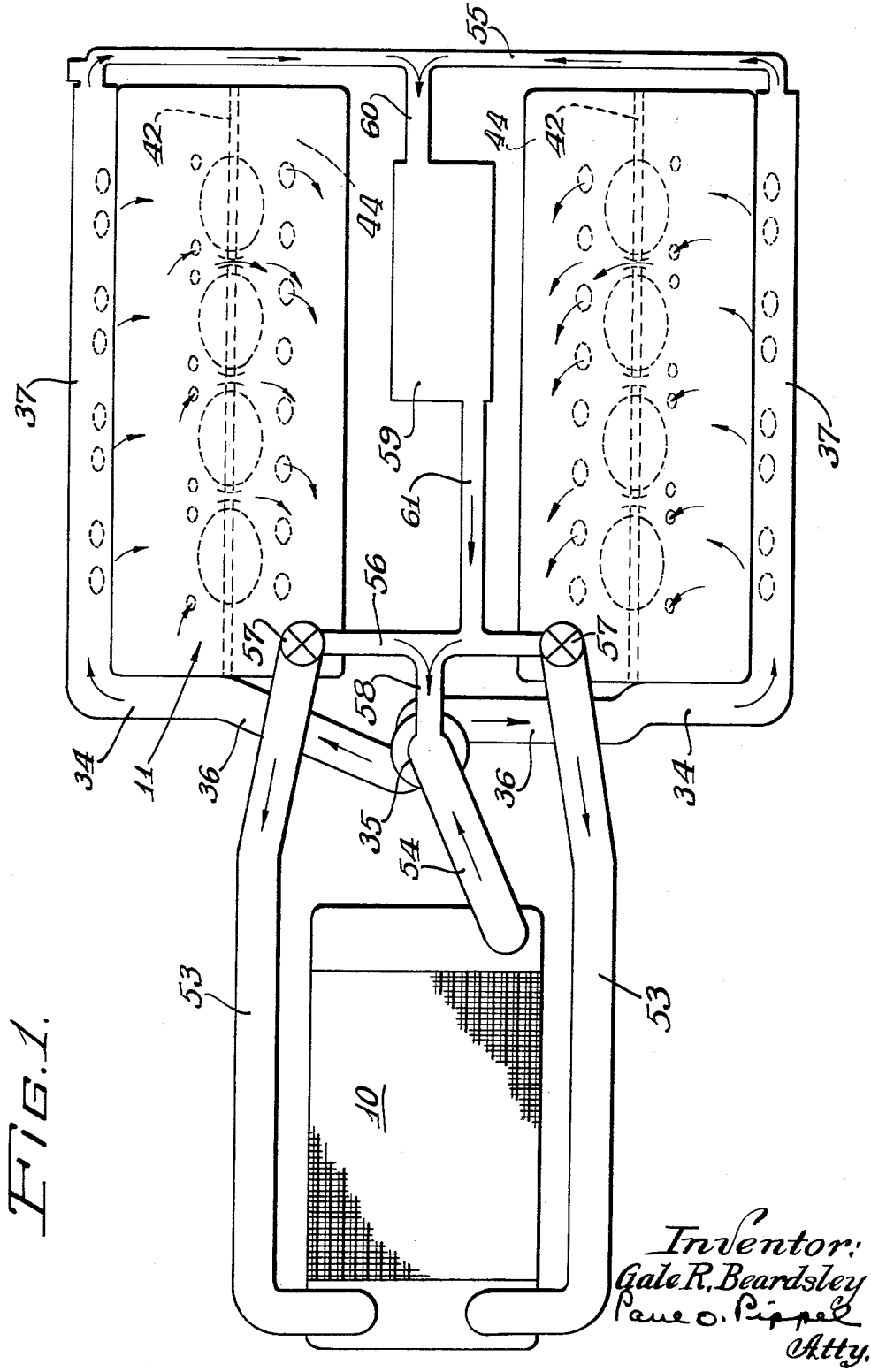
Figure 1 is a schematic view showing the course taken by the coolant between the radiator and the engine.

The lower wall 41 of the cylinder head 23, which abuts the upper wall 46 of the bank 12 and is secured thereto, is provided with a series of openings 47 which are registrable with openings 48 formed in the upper wall 46. The cross sectional area of each opening 48 is progressively slightly larger than the cross sectional area of the opening 48 adjacent thereto and spaced closer to the inlet passage 34. Thus, coolant received in the inlet manifold 37 is permitted to flow upwardly into the distributing header 43. The lower wall 41 and the upper wall 46 are further provided with registering openings 49 and 50, respectively, for establishing liquid communication between the distributing header 43 and the cylinder block jacket 39. From the foregoing, it will be appreciated that coolant delivered to the inlet manifold 37 under pressure flows into the distributing header 43 where the flow is divided; a portion of the coolant goes through the openings 24 in the partition 42 into the outlet chamber 44 with considerable velocity since the pressure of the coolant is greater in the header than in the outlet chamber 44 to thus produce a thorough washing or scrubbing action across the valve guides 45 and the combustion chambers 27 and a portion of the coolant flow passes through the restricting openings 49, 50 into the cylinder block jacket 39 where it circulates around the cylinders 14. The outlet chamber 44 is in relatively unrestricted coolant communication with the cylinder block jacket 39 by virtue of registering apertures 51 and 52 formed, respectively, in the lower wall 41 of the cylinder head 23 and the upper wall 46 of the bank 12. As best illustrated in Figure 1, the heated coolant from the outlet chamber 44 of each bank 12 and 13 flows through conduits 53 to the upper part of the radiator 10 where the heat is dissipated from the coolant in a conventional manner. A single conduit 54 leads from the lower part of the radiator 10 to the suction side of the fluid pressure, circulating pump 35.

As stated hereinbefore and as shown in Figure 8, the effective cross sectional area of the inlet manifold 37 progressively decreases from the end thereof connected to the pump 35 to its opposite end remote from the pump. It is well known that the quantity of fluid flowing through an orifice in a given period of time depends upon the pressure head exerted on the fluid and the cross sectional area of the orifice. It is also well known that there is a normal drop in pressure of fluid as it flows through a pipe having a uniform cross sectional area throughout its length. Hence, in order to insure substantially the same amount of coolant flowing through the registered openings 47 and 48 remote from the pump 35 as those nearest the pump the inlet manifold 37 is constructed as noted above in an attempt to maintain the fluid pressure constant along the entire length of the inlet manifold by compensating for the normal pressure drop which is accomplished by decreasing the cross sectional area of the inlet manifold 37 in the direction of flow from the pressure source. While the pressure of the fluid could be maintained constant along the entire length of the inlet manifold to insure an equal quantity of coolant flow to each cylinder 14 regardless of its disposition in the bank 12 or 13 by merely progressively decreasing the cross sectional area of the inlet manifold 37 in the direction of flow from the pressure source it has been found commercially impractical to do so because of the relatively small cross sectional area of the inlet manifold required at the end thereof spaced the greatest distance from the pump 35. Thus, as stated hereinbefore, the openings 48 nearest the pump 35 have a slightly smaller cross sectional area than those disposed at the opposite end of the inlet manifold 37 to positively insure the same quantity of coolant flowing to each cylinder 14. In addition to the provision for equalizing the coolant flow to each cylinder in each bank 12, 13, an equalizer tube 55 interconnects the ends of the inlet manifolds 37 remote from the pump 35 and insures an equalization of coolant flow to and, thus, the temperature of, each bank 12, 13 by equalizing the pressures existing in the inlet manifolds 37.

As best illustrated in Figures 1 and 2, a conduit 56 interconnects the conduits 53. A thermostatically-controlled by-pass valve 57 of conventional design is interposed in the conduit 56 adjacent each end thereof. Another conduit 58 leads from the suction side of the pump 35 to the conduit 56 at a point intermediate the thermostatically-controlled valves 57. From the foregoing, it will be appreciated that during the warm-up period of the engine part of the flow of the heated coolant being discharged from the outlet chambers 44 can be diverted from flowing to the radiator 10 and directed to the pump 35 by the operation of the thermostatically controlled valves 57.

The engine 11 is also provided with a lubricating oil cooler 59 which is, as shown in Figures 1 and 3, mounted on the engine in the V-shaped space between the cylinder banks 12 and 13. Coolant enters the oil cooler 59 through a conduit 60 which is in fluid communication with the equalizer tube 55. The coolant, after circulating within the oil cooler 59 flows through a return conduit 61 which is connected to the by-pass conduit 56.

In operation, coolant, such as water, is discharged by the pump 35 under pressure to the inlet manifolds 37 extending along the lengths of the cylinder banks 12 and 13. The fluid pressure of the coolant is maintained substantially constant along the entire lengths of the inlet manifolds 37 whereby the flow of the coolant to the distributing headers 43 through each pair of registering openings 47 and 48 is substantially the same regardless of the disposition of the pair with respect to the pump 35. The coolant passes from the distributing headers 43 transversely through the partitions 42 to the outlet chambers 44, and simultaneously a portion of the coolant flow is directed downwardly into the cylinder bank jackets 39 from the distributing headers. It is to be understood that the total effective cross sectional area of the passages leading from the distributing headers 43 is less than the cross sectional area of the inlet passages 34 and hence, the coolant within the headers is always under pressure during operation of the engine 11. Inasmuch as the coolant is under pressure in the headers 43, it goes through the openings in the partition 42 with considerable velocity to thus effectively scrub or wash the valve guides 45 and the upper walls of the combustion chambers 27. That portion of the coolant received by the distributing headers 43 which does not flow directly to the outlet chambers 44 flows to the cylinder bank coolant jackets 39 where it circulates by virtue of the pressure differential existing between the distributing headers 43 and the outlet chambers 44 as well as by thermo-siphonic action and passes to the outlet chambers 40. From the outlet chambers 44 the now heated coolant returns to the pump 35 either directly through the by-pass conduit 56 or by way of the radiator 10, depending on the setting of the thermostatically-controlled valves 57. The coolant received by the inlet manifolds 37 which does not pass into the distributing headers 43 flows into the equalizer tube 55 where it is directed to the oil cooler 59. The coolant emitted from the oil cooler 59 returns to the pump 35 by way of the by-pass conduit 56 and conduit 58.

The embodiment of the invention chosen for the purposes of illustration and description herein is that preferred as the result of selective tests based upon the requirements for achieving the objects of the invention and developing the utility thereof in the most desirable manner, due regard being had to existing factors of economy, simplicity of design and construction, production methods and the improvements sought to be effected. It will be appreciated, therefore, that the particular structural and functional aspects emphasized herein are not intended to exclude, but rather to suggest, such other adaptations and modifications of the invention as fall within the spirit and scope of the invention as defined in the appended claims.

What is claimed is:

1. In an internal combustion engine, a cylinder block structure having a series of cylinders arranged side by side in a line longitudinally of the engine and including a jacket surrounding said cylinders through which a cooling medium may be circulated; a removable cylinder head structure for closing the open upper ends of said cylinders, said head structure including a coolant jacket; a longitudinally extending partition disposed within said head structure jacket to divide a portion of said jacket from the main part thereof to form a coolant distributing header and a coolant outlet chamber, respectively, said partition serving as a side wall for said header and chamber and having a plurality of longitudinally spaced apertures formed therethrough for establishing direct coolant communication between said header and chamber; a plurality of valve stem guides formed integrally with said partition and arranged along the same; first passage means for establishing coolant communication between said header and the block structure jacket; second passage means for establishing coolant communication between said block structure jacket and said chamber, said first and second passage means including a plurality of apertures formed in the bottom wall of said head structure registrable with holes provided in the mating, upper face of said block structure; a fluid pressure pump; a coolant inlet manifold integrally formed in said block structure and extending longitudinally of the engine along one side of said block structure, said manifold having longitudinally spaced outlet ports registrable with apertures formed in the bottom wall of said header for establishing coolant communication between said manifold and header said ports progressively increasing in cross sectional area from one end of said inlet manifold to its opposite end, said manifold progressively decreasing in cross sectional area along its length, said pump having a discharge opening communicating with the end of said manifold having the largest cross sectional area to thereby maintain a substantially constant coolant pressure along the length of said manifold.

2. In an internal combustion engine, a cylinder block structure provided with a plurality of longitudinally aligned cylinders and a coolant jacket surrounding said cylinders; a cylinder head structure secured to the upper face of said block structure having a coolant jacket; a plurality of longitudinally aligned and spaced valve stem guides in said head structure; webs between adjacent valve stem guides defining one wall of a distributing header and an outlet chamber, said webs having longitudinally spaced apertures therethrough for establishing cooling medium communication between said header and chamber, said header and chamber being constructed and arranged to communicate with said block structure jacket; a coolant inlet manifold integrally formed in said block structure and extending longitudinally of the engine along one side of said block structure, said manifold having longitudinally spaced outlet ports registrable with apertures formed in the bottom wall of said header, said manifold progressively decreasing in cross sectional area along its length; and a fluid pressure pump having a discharge opening communicating with the end of said manifold having the largest cross sectional area.

3. In an internal combustion engine, a cylinder block structure with a plurality of longitudinally aligned cylinders and a coolant jacket surrounding said cylinders; a cylinder head structure having a bottom face abutting the upper face of said cylinder block structure, said head structure having a coolant distributing header extending longitudinally of the engine and a coextensive outlet chamber adjacent to and in coolant communication with said header, said header and chamber being constructed and arranged to communicate with said block structure coolant jacket; and a coolant inlet manifold extending longitudinally of the engine along one side of said block structure, said manifold having a plurality of longitudinally spaced outlet ports registrable with apertures formed in the bottom wall of said header.

4. The combination as set forth in claim 3, in which said inlet manifold progressively decreases in cross sectional area along its length; and a fluid pressure pump has a discharge opening communicating with the end of said manifold having the largest cross sectional area.

5. In an internal combustion engine, a cylinder block structure having a cylinder therein and a coolant jacket surrounding said cylinder; a cylinder head structure for closing the open upper end of said cylinder, said head structure including a coolant jacket; a partition disposed within said head structure jacket defining one wall of a distributing header and an outlet chamber; an inlet manifold arranged along one side of said block structure; and means for establishing coolant communication between said inlet manifold and said header, between said header and said cylinder block structure coolant jacket, between said header and said chamber, and between said cylinder block structure coolant jacket and said chamber.

6. In an internal combustion engine, a cylinder block structure having a cylinder therein and a coolant jacket surrounding said cylinder; a removable hollow cylinder head structure secured to the upper face of said block structure; a partition disposed within said head structure to form a distributing header and an outlet chamber, said partition having a plurality of apertures therethrough for establishing coolant communication between said header and chamber; an inlet manifold integrally formed in said block structure, said manifold having outlet ports registrable with apertures formed in the bottom wall of said header; and means for establishing coolant communication between said header and said block structure jacket and between said block structure jacket and said chamber.

7. In an internal combustion engine, a V-type cylinder block comprising a pair of banks, each bank containing a plurality of cylinders and having a coolant jacket therefor; a cylinder head for each bank provided with a distributing header and an outlet chamber, said header and chamber of each bank being in coolant communication with each other and with the bank coolant jacket associated therewith; an inlet manifold arranged along one side of each bank and extending longitudinally thereof, each of said manifolds having longitudinally spaced outlet ports registrable with apertures formed in a respective header whereby coolant is delivered to said headers, said manifolds progressively decreasing in cross sectional area along their lengths; a fluid pressure pump having a discharge opening communicating with the ends of said manifolds having the largest cross sectional area; and a pressure equalizing tube interconnecting the ends of the manifolds having the smallest cross sectional area.

8. The combination as set forth in claim 7, including a lubricating oil cooler; and conduit means extending between said oil cooler and said equalizing tube and between said oil cooler and the suction side of said pump.

9. The combination as set forth in claim 8, including a radiator; a conduit leading from each of said chambers to said radiator; a single conduit for conveying coolant from said radiator to the suction side of said pump; and conduits extending between one end of each of said chambers and the conduit means extending between said oil cooler and the suction side of said pump, said conduits having valves therein for regulating the quantity of coolant flowing to said radiator.

10. In an internal combustion engine, a V-type cylinder block comprising a pair of banks, each bank containing a plurality of cylinders and having a coolant jacket therefor; a cylinder head for each bank provided with a distributing header and an outlet chamber, said header and chamber of each bank being in coolant communication with each other and with the bank coolant jacket associated therewith; an inlet manifold arranged along one side of each bank for delivering coolant under pressure to a respective header; and a pressure equalizing tube connecting an end of one inlet manifold to an end of the other inlet manifold.

11. The combination as set forth in claim 10, in which a fluid pressure pump is provided for supplying coolant under pressure to said inlet manifolds; a lubricating oil cooler; and conduit means extending between said oil cooler and said equalizing tube and between said oil cooler and the suction side of said pump.

12. The combination as set forth in claim 11, including a radiator; a conduit leading from each of said chambers to said radiator; a single conduit for conveying coolant from said radiator to the suction side of said pump; and conduits extending between each of said chambers and the conduit means extending between said oil cooler and the suction side of said pump, said conduits having valves therein for regulating the quantity of coolant flowing to said radiator.

13. In an internal combustion engine, a cylinder block containing a cylinder and a coolant jacket surrounding said cylinder; a cylinder head provided with a distributing header and a co-extensive outlet chamber, said header and chamber being in coolant communication with each other; means for establishing coolant communication between said header and said block coolant jacket and between said block coolant jacket and said outlet chamber; and an inlet manifold arranged along one side of said block for delivering coolant solely to said header.

14. The combination as set forth in claim 13, in which said inlet manifold progressively decreases in cross sectional area from one end to the other; and a fluid pressure pump having a discharge opening communicating with the end of said manifold having the largest cross sectional area.

References Cited in the file of this patent

UNITED STATES PATENTS

| | | |
|---|---|---|
| 1,687,353 | Swanson | Oct. 9, 1928 |
| 1,838,436 | Morrill | Dec. 29, 1931 |

FOREIGN PATENTS

| | | |
|---|---|---|
| 332,523 | Great Britain | July 21, 1930 |